April 30, 1963 R. L. FREEMAN ETAL 3,088,093
WAVE SIGNAL RECEIVER MONITORING APPARATUS
Filed Nov. 6, 1957
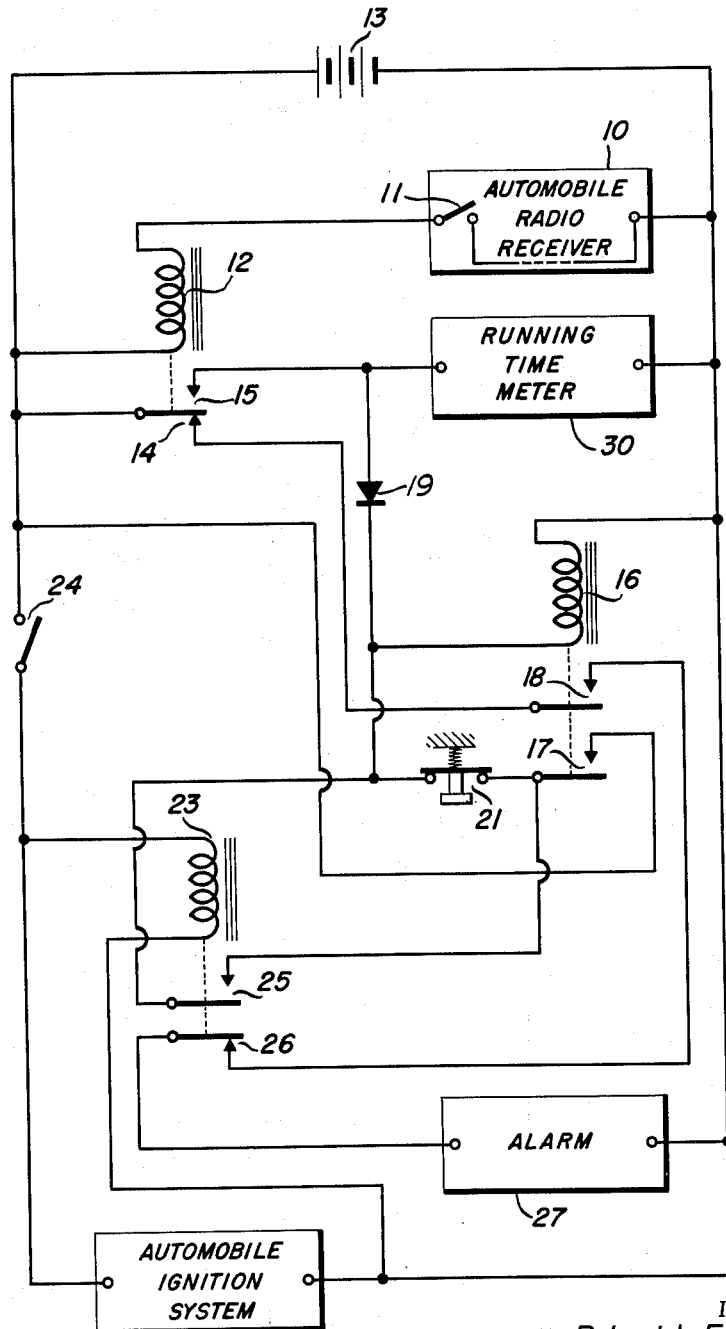
INVENTORS
Robert L. Freeman and
BY Henry A. Rahmel
ATTORNEYS

United States Patent Office 3,088,093
Patented Apr. 30, 1963

3,088,093
WAVE SIGNAL RECEIVER MONITORING APPARATUS
Robert L. Freeman, Glenview, and Henry A. Rahmel, Evanston, Ill., assignors to A. C. Nielsen Company, Chicago, Ill., a corporation of Delaware
Filed Nov. 6, 1957, Ser. No. 694,810
6 Claims. (Cl. 340—54)

The present invention relates to wave signal receiver monitoring apparatus and more particularly to such apparatus as is particularly suited for use in monitoring the listening habits of persons using automobile type radios.

In order to determine the effectiveness of radio advertising, it is desirable to collect data which is indicative of the listening habits of a selected group of persons who use radio receivers and to compute, from this data, the total number of persons who similarly used their respective receivers in the same manner as did the persons in the sample. Accordingly, a number of different types of apparatus have been developed for automatically recording information pertaining to the operating conditions of the receivers used by the persons in the sample, but because of the relatively complex nature of such apparatus it is not well suited for use in connection with automobile radios. Since, however, a sizeable portion of present day radio listening takes place in automobiles, where accurate ratings of the drawing power of particular programs and types of programs are desired, it is necessary to provide data indicative of the use of automobile radios as well as of other types of radios. Therefore, some means for monitoring the use of automobile radios must be provided and preferably this means should include monitoring apparatus which is small in size and low in cost. Necessarily, it must be relatively simple and, of course, its power drain must be low unless it is to include its own separate source of power rather than use the power from the automobile battery.

This monitoring apparatus may take the form of a simple diary in which the collaborator who uses the radio records, by means of suitable entries, the manner in which he uses the receiver. The results so obtained, however, are very inaccurate since the collaborator may frequently forget to make the proper entries in the diary. Therefore, in order to improve the quality of the data which is used in computing the various ratings, a low current drain running time meter may be connected in circuit relationship with the radio so that the meter is energized whenever the radio is turned on. By comparing the total running time recorded by the meter with the entries made in the diary, the clearly erroneous data may be omitted from the calculations thus improving the quality of the calculated ratings.

In order to reduce the amount of useless data which may thus be accumulated and discarded, it is desirable to provide means for improving the accuracy of the data as originally recorded. In similar monitoring apparatus which is used in the home, a reminder means such, for example, as an audible or visible alarm is periodically rendered effective to remind the users of the receiver that entries should be made in the diary. This alarm may, therefore, be energized periodically such as once each half hour and, in addition, it may be energized each time that a change in the operating condition of the receiver is made. In the case of an automobile receiver, however, this would be undesirable since such an alarm might disturb the user who would probably be driving the car at the time the reminder signal was given. Moreover, since he would be operating the automobile at this time, the driver would be unable to make the proper entry in the diary. Consequently, the alarm would be wasted since if the entries are not immediately made when the alarm sounds, they may never be made. Nevertheless, it is important that some means be provided for reminding the collaborator to make entries in his diary if sufficient data is to be derived from a reasonable number of receivers.

Therefore, a principal object of the present invention is to provide new and improved apparatus for reminding the users of automobile radio receivers to make proper entries in a diary.

Another object of the present invention is to provide a new and improved reminder circuit for reminding automobile radio receiver users to enter in a diary data indicative of the operating conditions of their associated receivers.

Briefly, the above and further objects are realized in accordance with the present invention by providing an alarm device which is connected in circuit with an automobile receiver which also has connected thereto an elapsed time indicator, so that whenever the ignition of the automobile is turned off so as to stop the engine of the car, if the radio receiver has been tuned in since the time that the ignition was last energized, the alarm is sounded. The person driving the automobile is thus reminded to enter in a diary, provided in proximity to the radio, the programs to which he had been listening or the stations to which the radio had been tuned since the last entry was made. The described circuit which embodies the present invention is equally suitable for use with those automobiles in which radios may be operated when the ignition switch is turned off, in which case the alarm is not sounded until both the radio and the ignition are deenergized.

The invention, both as to its organization and method of operation, together with further objects and advantages thereof, will best be understood by reference to the following description taken in connection with the accompanying drawing in which the single figure is a schematic diagram of apparatus for monitoring the use of an automobile radio receiver.

Referring now to the drawing, an automobile radio receiver 10 is shown in block diagram form and includes the usual on-off switch 11 which is serially connected with the winding of a relay 12 across a suitable source of D.C. voltage 13, which, in most cases, is the automobile battery. Whenever, therefore, the receiver 10 is energized, the relay 12 is operated to open a set of normally closed contacts 14 and to close a set of normally open contacts 15. The contacts 15 are serially connected with a rectifier 19 and the winding of a relay 16 across the automobile battery 13 so that when the automobile radio receiver 10 is energized, the relay 16 is operated, thereby to close two sets of normally open contacts 17 and 18, respectively. The rectifier 19 prevents operation of the running time meter through the circuits associated with the relay 16. Accordingly, the running time meter 30 can only be energized when the contacts 15 are closed and thus when the receiver 10 is energized. The normally open contacts 17 are serially connected across the battery 13 with the winding of the relay 16 and a normally closed on-off type switch 21 so that the contacts 17 comprise a set of holding contacts which maintain the relay 16 operated following the energization thereof until the switch 21 is at least momentarily opened. When the switch 21 is opened, the energization circuit for the relay 16 is interrupted and it drops out. A third relay 23 is provided with a winding which is serially connected across the battery 13 with the ignition switch 24 of the associated automobile, the winding of the relay 23 being connected in parallel with the ignition system of the automobile so that whenever the ignition switch 24 is closed to energize the ignition system of the car, the relay 23 is operated.

As shown, the relay 23 includes a set of normally open contacts 25 which are connected directly across the switch 21 and a set of normally closed contacts 26 are serially connected with the contacts 18 and 14 and an electrically energizable alarm device 27 across the battery 13.

In order to provide a record of the overall running time of the receiver 10, a running time meter or elapsed time indicator 30 is connected in circuit with the receiver 10 so as to be energized whenever the receiver is energized. More specifically, the meter 30, which may be a clock or the like, is serially connected with the contacts 15 across the battery 13.

Considering now the operation of the reminder device of the present invention, when the ignition switch 24 is initially closed, the relay 23 is operated to open its set of normally closed contacts 26 thereby to prevent energization of the alarm device 27. Assuming that with the automobile thus operating, the driver closes the switch 11 to turn on the radio 10. The relay 12 is thereby operated to close the normally open contacts 15 and thus to energize the running time meter 30 which thereafter remains energized so long as the receiver 10 is energized. Whenever the receiver 10 is deenergized, the relay 12 is, of course, released and the running time meter 30 is deenergized. When the relay 12 initially operates, however, the relay 16 is energized through the normally open contacts 15 thereby to close its holding contacts 17 and also to close the contacts 18 which are serially connected with the alarm device 27. At the time the switch 11 is first closed and the relay 12 first operates, the normally closed contacts 14, which are serially connected with the alarm device 27, are opened, thereby to prevent energization of the alarm 27 even if the ignition switch 24 had not previously been closed to open the contacts 26. It may be seen, therefore, that either the receiver or the ignition switch 24 may be first energized since in both cases the energization circuit for the alarm device 27 is interrupted and maintained interrupted until both of the switches 11 and 24 are thereafter opened. When both of these switches are opened, the relay 23 is released to close the contacts 26 and the relay 12 is released to close the contacts 14. The relay 16, however, remains operated through its holding contacts 17 so that the energization circuit of the alarm device 27 is completed through the contacts 26, 18, and 14. The alarm is thus sounded or a visual indication is given to the user of the radio that he should record in the diary the stations to which the receiver had been tuned since the last entry was made. If desired, a time delay device may be employed for deenergizing the alarm device 27 after a predetermined time, but preferably only the switch 21 is provided for this purpose. In order to deenergize the alarm 27, the button 21 is momentarily actuated to interrupt the energization circuit for the relay 16, which relay is thus released and the system is ready for the next operation. Also, the switch 21 may be so constructed as to be opened by the removing of a pencil from a suitable receptacle to make the entry in the diary.

In the illustrated embodiment of the invention, the receiver 10 is shown as being independent of the ignition switch 24, but in most cases the receiver 10 is supplied with energization current only when the ignition switch 24 is closed. However, this identical remainder circuit may be connected in the illustrated manner in that type of automobile circuit in which the receiver is energized only when the ignition switch is closed since unless the receiver 10 is energized, the relay 12 is released and, therefore, its contacts 14 which are in the energization circuit for the alarm device 27 are closed. It may thus be seen that whenever the ignition system as well as the radio are deenergized following a period in which the receiver 10 had been energized, the alarm device 27 is energized, the particular circuitry which is employed for energizing the ignition and the radio being unimportant.

While a particular embodiment of the invention has been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. Reminder apparatus for use in the monitoring of an automobile radio receiver, comprising a first relay having a winding, a set of normally open contacts and a set of normally closed contacts, said winding being serially connected with said receiver whereby said relay is operated while said receiver is energized, a second relay having a winding and first and second sets of normally open contacts, said winding of said second relay being serially connected with said normally open contacts of said first relay across a source of energization voltage, a third relay having a winding, a set of normally open contacts and a set of normally closed contacts, the winding of said third relay being serially connected across a source of energization voltage with a set of normally open contacts on the ignition switch of the automobile in which said radio receiver is located so that said third relay is operated whenever the ignition circuit of said automobile is energized, the normally open contacts of said second and third relays being serially connected across the normally open contacts of said first relay thereby to constitute a holding circuit for said second relay, an electrically energizable alarm device for effecting a reminder signal, said alarm device being serially connected with the normally closed contacts of said first and third relays and said second set of contacts of said second relay across a source of energization voltage, and a normally closed switch connected across the normally open contacts of said third relay, whereby actuation of said last-named switch while said receiver and said ignition circuit are deenergized causes the deenergization of said alarm device.

2. Reminder apparatus as set forth in claim 1 wherein an elapsed time indicator is serially connected across a source of energization voltage with said normally open contacts of said first relay.

3. Reminder apparatus for use in the monitoring of an automobile radio receiver, comprising first relay means actuated while said receiver is energized, second relay means actuated in response to actuation of said first relay means, third relay means responsive to the operation of the ignition switch of the automobile in which said radio receiver is located, normally open contacts of said second and third relay means being serially connected across a set of normally open contacts of said first relay means thereby to constitute a holding circuit for said second relay means, an electrically energizable alarm device for effecting a reminder signal, said alarm device being serially connected with normally closed contacts of said first and third relay means and a set of normally open contacts of said second relay means across a source of energization voltage, and a normally closed switch connected across said normally open contacts of said third relay means, whereby actuation of said last-named switch while said receiver and said ignition circuit are deenergized causes the deenergization of said alarm device.

4. Reminder apparatus for use in the monitoring of an automobile type radio receiver used in automobiles having the conventional ignition switch, comprising an elapsed time indicating device connected in circuit with said receiver so as to be energized whenever said receiver is energized and deenergized whenever said receiver is deenergized, an electrically energizable alarm device connected in circuit relationship with said receiver and said ignition switch of the automobile in which said receiver is located, first means responsive to the closing of said ignition switch for rendering said alarm ineffective to provide a reminder signal, and second relay means responsive to the energization of said receiver for rendering said alarm device effective upon opening of said ignition switch following a period subsequent to the closing of said ignition switch when said receiver had been energized, whereby the user of said receiver is reminded to make an entry in a diary to record the stations to which said receiver was tuned during said period.

5. Apparatus for use in the monitoring of an automobile type radio receiver having the conventional ignition switch, an electrically energizable alarm device connected in circuit relationship with said receiver and said ignition switch of the automobile in which said receiver is located, first relay means responsive to the closing of said ignition switch for rendering said alarm ineffective to provide a reminder signal, and second relay means responsive to the energization of said receiver for rendering said alarm device effective upon opening of said ignition switch following a period subsequent to the closing of said ignition switch when said receiver has been energized, whereby the user of said receiver is reminded to make an entry in a diary to record the stations to which said receiver was tuned during said period.

6. Apparatus as set forth in claim 5 wherein an elapsed time indicator is connected in circuit relation with said receiver so as to be energized only when said receiver is energized and thus to provide an indication of the overall time of operation of said receiver.

References Cited in the file of this patent
UNITED STATES PATENTS

| | | |
|---|---|---|
| 2,403,123 | Roper | July 2, 1946 |
| 2,660,509 | Rusch | Nov. 24, 1953 |
| 2,706,806 | Johnson | Apr. 19, 1955 |
| 2,722,673 | Turner | Nov. 1, 1955 |
| 2,742,630 | Muncheryan | Apr. 17, 1956 |
| 2,799,843 | Savino | July 16, 1957 |
| 2,855,993 | Rahmel | Oct. 14, 1958 |